June 9, 1936.  A. VALENTIN ET AL  2,043,522
PHOTOGRAPHIC APPARATUS FOR COLOR CINEMATOGRAPHY
Filed April 1, 1935   3 Sheets-Sheet 1

Inventors:
Augusto Valentin
and Laurent Bassani
By their Attorney

June 9, 1936. A. VALENTIN ET AL 2,043,522
PHOTOGRAPHIC APPARATUS FOR COLOR CINEMATOGRAPHY
Filed April 1, 1935 3 Sheets-Sheet 2
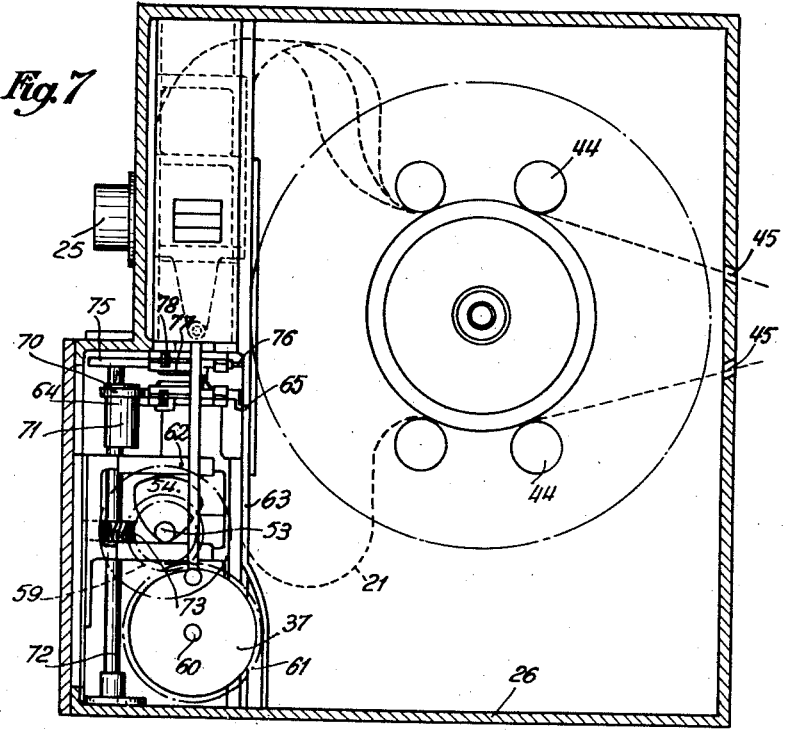
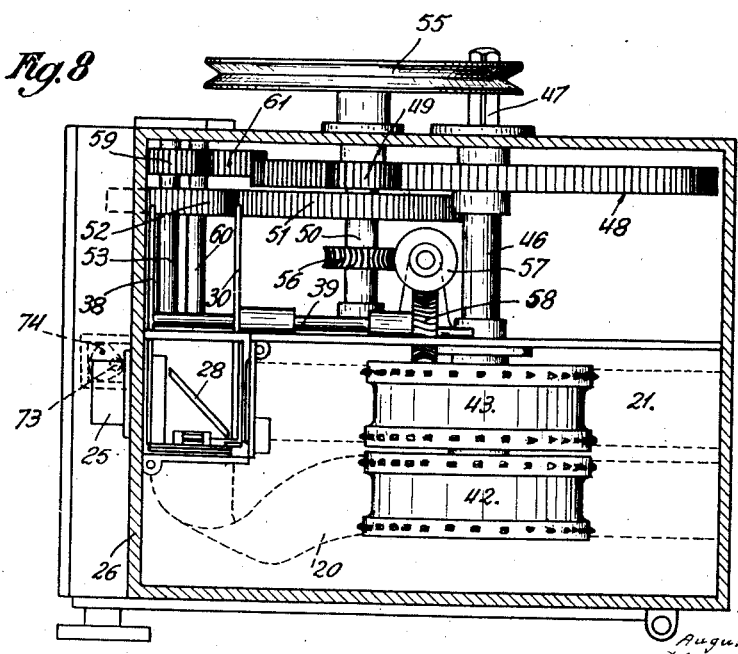

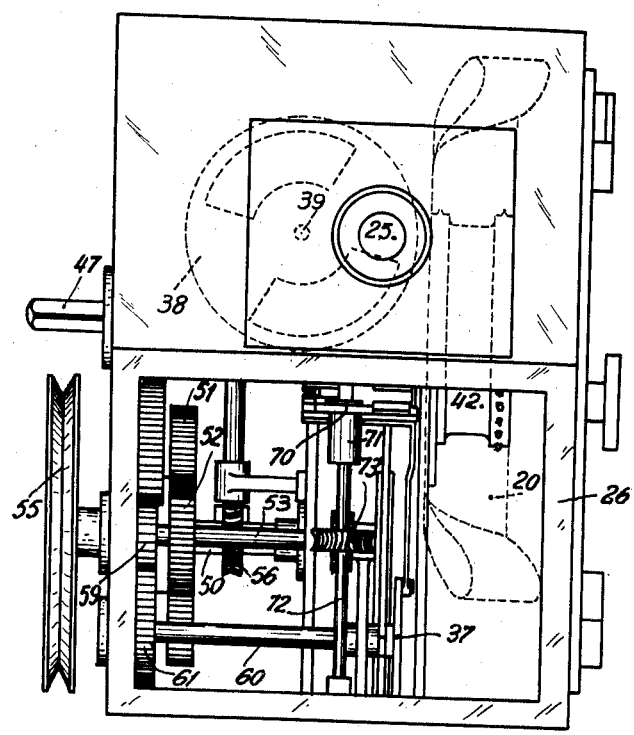
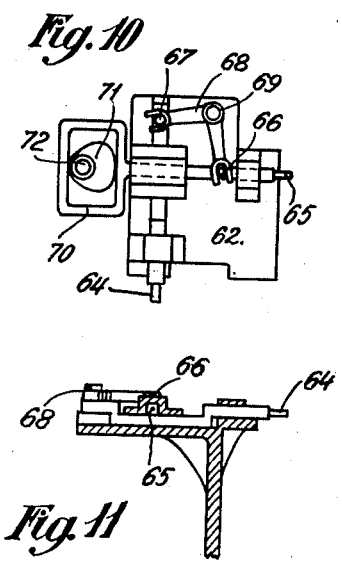
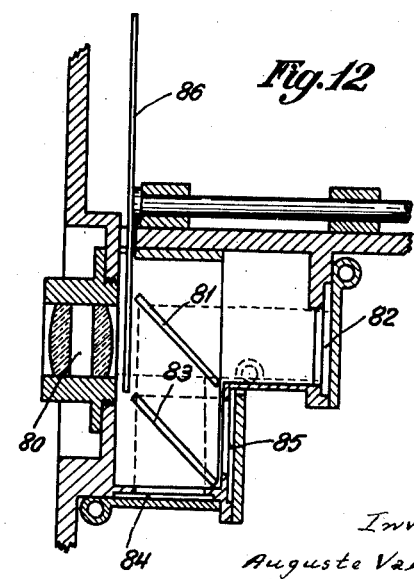

Patented June 9, 1936

2,043,522

UNITED STATES PATENT OFFICE 2,043,522

PHOTOGRAPHIC APPARATUS FOR COLOR CINEMATOGRAPHY

Auguste Valentin and Laurent Bassani, Paris, France

Application April 1, 1935, Serial No. 14,144
In France April 13, 1934

2 Claims. (Cl. 88—16.4)

The present invention relates to cinematography in colors for which there are first produced on one, two or three films of each picture, two or three negative images allocated each to a definite color due to suitable selective screens arranged between the objective and the film.

Numerous types of apparatus are known for taking pictures and intended to produce these results, and some of these have an objective for each image to be taken, but the objectives thus used cannot evidently be directed exactly to one point in space and in particular for the foreground or "close-up" the images obtained cannot be superposed when projected.

It has also been proposed to take the three views consecutively by means of a single objective, but this led to the making of three movements of the film for taking the three single colors which were to constitute a picture and these three movements had naturally to be carried out in the time used for one movement in taking a picture in black, which owing to the considerable effort exerted by the feeder gripping devices on the perforation of the film, caused tearing and deformations which do not permit of obtaining the distribution of the single color images on the film with the entire accuracy indispensable to ensure, on the projection, the registering of the single colors on the screen. Furthermore, this projection could not be carried out by means of the projecting apparatuses already existing in the halls.

On the other hand, and independently of the times of exposure which were considerably reduced for each color, there was a lapse of time too great between the taking of the first color and that of the third color, so that in recording scenes in which rapid movements took place, the superposing of the separate colors could not be obtained with the entire precision necessary.

The present invention relates to an apparatus for taking views, due to which and by means of a single objective, two or three different negative films may be simultaneously impressed by the colored rays which appertain to them.

In this apparatus, there is arranged between the objective and a first film situated normally with respect to this objective, a semi-transparent glass inclined at 45° with respect to the optical axis of the objective, and a second negative film is placed at a right angle to the first one in the path of the rays reflected by the glass.

If it is desired to impress simultaneously three films, a second glass parallel to the first is arranged on the beam of the reflected rays, the third film is suitably placed with respect to this second glass.

The beam of rays coming from the objective and striking the first inclined glass, is divided into two parts, a first part passes through the glass and continues on its way towards the first film, whilst another portion of the beam is reflected and is directed on to the second film.

In the same way, on the second glass the beam is again divided into two parts, so that finally the three films are simultaneously impressed.

To form the selection of the colors, it is advisable to utilize the glasses themselves as screens, and to this end the back of the glass or glasses is coated with a varnish having the desired coloring.

The apparatus constructed according to the invention naturally permits of a mixed solution, that is to say, the taking of a three-color view (three images of each picture) on two negative films.

To this end, one of the films is exposed, as has been described, through an inclined glass, and the other film receives successively by reflection in the glass two impressions which although not simultaneous, are sufficiently close to be superposed on the projection. Naturally, for each of these impressions, a colored selective screen is interposed between the film and the glass.

The invention is illustrated by way of example in the accompanying drawings, in which—

Figure 7 is a side view of the complete mechanism of the apparatus for taking views;

Figure 8 is a plan view of this mechanism;

Figure 9 is a front view of the same mechanism;

Figures 10 and 11 are detailed views with respect to the control of the feeder gripping devices of the film;

Figure 12 is a view of the optical portion of an apparatus for taking views with three films.

Figure 1:
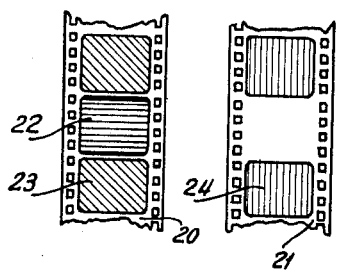
Figure 1 shows a group of two negative films adapted for use in three-color photography.

It is known that for three-color cinematographic projection, there are used positive films which are made by means of negative films impressed as shown in particular by Figure 1, where two films 20 and 21 of ordinary dimensions are shown and which are impressed for each picture, the first with two images 22 and 23, and the second with a single image 24.

The images 22 and 23 may be, for example, respectively allocated to the blue and green rays, and the image 24 to the red rays.

Since, in the utilization of the films 20 and 21, their running rate should be equal, it is necessary to place the images 24 with intervals between them without an image, this interval being of the same dimensions as an image.

Figure 2:
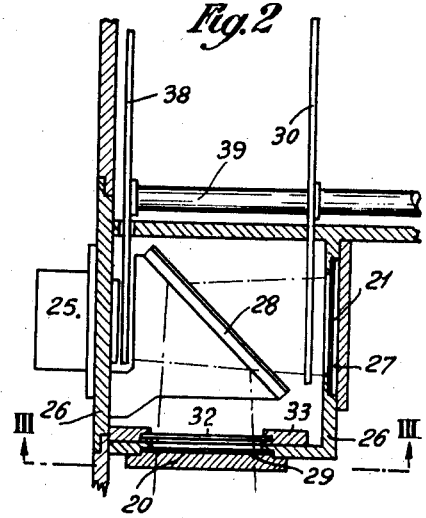
Figure 2 is a plan section of the optical part of an apparatus for taking three-color views on two negative films.

The optical portion of an apparatus for taking views according to the invention and permitting the impressioning of two films, comprises, as shown by Figure 2, an objective 25 mounted in the front part of dark chamber formed by the frame 26 of the apparatus. Perpendicularly to the optical axis of the objective 25, the frame 26 forms at a suitable distance a vertical passage 27 intended to receive the film 21.

Between the objective 25 and the film 21 is arranged, according to the invention, a glass 28 with parallel faces and inclined at 45° with respect to the optical axis of the objective 25.

Perpendicularly to the mean rays coming from the objective 25 and reflected by the glass 28, the frame 26 forms a second vertical passage 29 intended to receive the film 20.

In order to impress the film 21 by transparency through the glass 28, by means simply of red rays, the back of the glass 28 is coated with a red varnish. Furthermore, between the glass 28 and the film 21, there is arranged a shutter 30 (Figure 4) having an opening 31 permitting the passage of the luminous rays for a certain interval of time when the disc 30 rotates regularly.

Figure 6:
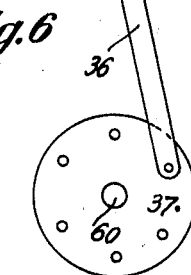
Figure 6 is a diagram illustrating the method of operation of the colored selective screen.
Figure 3:
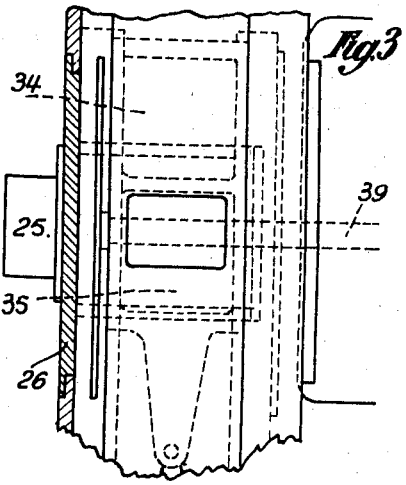
Figure 3 is an elevation on the line III—III of Figure 2.

Since it is necessary to impress the film 20 successively by means of the blue rays and then by the green rays, there is interposed between the glass 28 and the film 20 a movable double screen, shown particularly in Figure 6; this double screen comprises a frame 32 adapted to slide in vertical guides 33. Two screens, one, 34, green, and the other, 35, blue or violet, are fitted one below the other in the frame 32.

This frame, as shown by Figure 6, is connected by a rod 36 to a crank plate 37 rotating continuously. Finally, there is arranged between the objective 25 and the glass 28 a second rotating shutter 38 fixed on the same spindle 39 as the shutter 30, but which comprises as shown by Figure 5, two openings, of which one, 40, coincides with the opening 31 and the other, 41, is diametrically opposite to the first.

Figure 4:
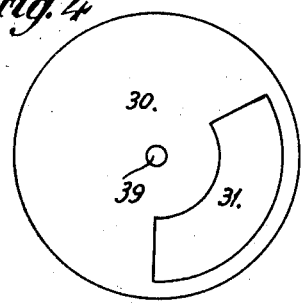
Figures 4 and 5 show the front view of two shutter discs used in the apparatus.
Figure 5:
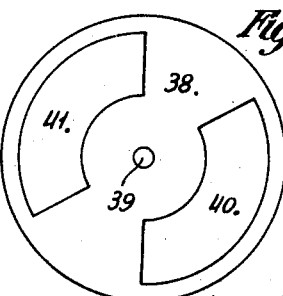

Figures 4 and 5, show that the angular extent of the openings 31, 40 and 41 is about 120°.

Figures 7, 8 and 9 show in detail the mechanism of the apparatus for effecting the suitable displacement of the films 20 and 21, the rotation of the rotary shutters 30 and 38 and the alternating sliding of the screen carrying frame 32.

On these figures will be seen most of the members which have been described, but it is now seen that the films 20 and 21 are moved respectively by two integral toothed drums 42 and 43 on which they are pressed, according to well-known practice, by loose rollers such as 44.

These films enter and leave the frame 26 by two passages indicated by reference character 45 and connecting the interior of this box with a suitable magazine, not shown.

The two toothed drums 42 and 43 are fixed on a spindle 46 which is terminated on the outside of the box by a square head 47 on which there can be engaged an ordinary feed crank (not shown).

On the same spindle 46 is keyed a toothed wheel 48 which engages with a pinion 49 of much smaller diameter and which is keyed on an intermediate spindle 50 itself carrying a toothed wheel 51 engaging with a pinion 52 keyed on a spindle 53, the end of which is seen on Figure 7 and which carries a cam 54 of constant width. It should be noted that these various countershaft gears give a great multiplication and that the rotation the spindle 53 is much more rapid than that of the operating crank of the apparatus.

The intermediate spindle 50 carries outside the apparatus a pulley 55 which is adapted to take a belt coming from a suitable motor (not shown) due to which the use of the crank could be avoided.

The spindle 50 also carries a helicoidal wheel 56 which, through the intermediation of two other wheels 57 and 58, rotates the spindle 39 which carries the shutter discs 30 and 38 at exactly the desired speed.

The spindle 53 which carries the cam 54, also carries a toothed wheel 59 which drives a pinion 61 keyed on to the spindle 60 of the crank plate 37 controlling the screen-carrying frame 32.

Finally, the cam 54 of constant width rotates in a cage 62 which is guided vertically in slides such as 63 of the frame 26. The cage 62 forms at its upper part a kind of platform which carries two horizontal gripping devices, 64 for the film 20, and 65 for the film 21. As shown particularly by Figures 10 and 11, each gripping device has a finger 66 or 67 and these two fingers are connected by a right angled lever 68 pivoting about an axis 69 of the cage 62.

Owing to this lever, it will be understood that the movements in advance and in return of the gripping devices 64 and 65, are absolutely identical for one or the other of the two gripping devices. The gripper 65 carries a small cage 70 which surrounds a cam 71 of constant width and of comparatively great height, so that the cage 70 can slide vertically on this cam without ceasing to be controlled.

The cam of constant width 71 is keyed on a spindle 72 which is rotated in a continuous manner by the horizontal spindle 53 due to two helicoidal pinions 73.

The spindle 72 also carries at its upper part a second cam of constant width shown at 74 in Figure 8 and there is seen at 75 on Figure 7 the cage for this cam. This cage comprises a counter grip 76 placed above the gripping device 65 which deals with the film 21.

By means of a counter movement by an elbow lever 77 similar to that shown in Figure 10, the counter grip 76 actuates another counter grip 78 which deals with the film 20.

The mechanism of the counter grips 76 and 78 is, on the whole, identical with that of the gripping devices 64 and 65, except that the constant width cams 71 and 74 are diametrically opposite and the counter grips 76 and 78 remain at a constant level, whereas the gripping devices 64 and 65 participate in the vertical movement of the cage 62.

The operation of the mechanism thus described is easily understood: the spindles 46 and 50 being set in movement, either by hand or by motor, the drums 42 and 43 rotate and feed the films at a definite speed, at the same time the shutters 30 and 38 and the spindles 53 and 72 rotate.

Supposing that fresh portions of film are in the passages 27 and 29, the constant width cam 74 is in a position such that the counter grips 76 and 78 are each engaged in a perforation of the films 20 and 21, and these films are thus rigidly held fast.

The corresponding openings 31 and 40 of the discs 30 and 38 come into the optical axis of the objective 25 so that the rays passing through this objective strike the glass 28. A portion of these rays pass through this glass and then through the layer of red varnish with which it is coated.

All the rays of colors other than the red are arrested by this layer and thus only the red rays strike the film 21.

Nevertheless, the other portion of the luminous beam coming from the objective is reflected towards the film 20, and since, at this instant the screen-carrying frame 32 has brought the green screen 34 opposite this beam of reflected rays only the green rays will impress the film 20.

Thus, the images 23 and 24 are impressed simultaneously. Immediately afterwards the shutter discs 30 and 38 interrupt the passage of the luminous rays and by the action of the constant width cams 71 and 74, the gripping devices 64 and 65 penetrate into the perforations of the films 20 and 21, while the counter grips 76 and 78 move away and permit them to shift in position.

From this moment, the cam 54 causes the cage 62 to descend, carrying with it the grips 64 and 65 and the films 20 and 21.

In the course of the following period, the counter grips 76 and 78 penetrate into the perforations. The gripping devices 64 and 65 move away from the films and the cage 62 again rises with a view to the following movement of descent. But the films 20 and 21 are, for the moment, held stationary, and the shutter disc 38 brings its opening 41 opposite the objective.

Since the disc 30 has a solid part in front of the film 21, no ray can strike this film. It is not the same as regards the film 20 which is impressed by the rays reflected from the glass 28, but this time, through the blue screen 35.

The image 22 of the film 20 is thus impressed thereon.

Immediately afterwards, the shutters again interrupt the luminous rays, the mechanism of the apparatus causes the films to descend with a view to the impression of the following picture, and so on.

The variation of the apparatus for taking views shown in Figure 12 is intended to permit the simultaneous taking of three single color images on three independent films, owing to which it is possible to take in any way whatever, positive copies.

This variation of the apparatus comprises as previously, a single objective 80 behind which is arranged an inclined glass 81.

Beyond this glass, there is in a vertical passage 82 a first film intended to be impressed by the rays which have passed through the glass 81. It is advisable that this film be impressed by red rays. To this end, there is applied to the back of the glass 81 a layer of red varnish.

Parallel to the glass 81 there is arranged a second glass 83 and beyond this glass is placed a vertical passage or corridor 84 intended to receive a second film which will be impressed by the rays reflected from the glass 81, but passing through the glass 83. It is advisable that these rays correspond simply to the green color, and to this end a varnish of this color is applied to the back of the glass 83.

Finally, in front of the rays reflected by the glass 83 there is arranged a vertical passage 85 taking a third film intended to be impressed for example by the blue or violet rays emanating from the subject.

To this end, a fixed selective screen of corresponding color is interposed between the passage or corridor 85 and the glass 83.

The mechanism of the apparatus for taking views according to Figure 12 is simpler than that previously described, since there are no longer any movable selective screens.

The three films being impressed simultaneously, a single shutter 86 is sufficient and it must be interposed between the objective and the glass 81.

The members effecting the simultaneous descent of the films obviously comprise three gripping devices and three counter grips, but it should be noted that the passages or slides 82 and 85 are parallel, so that two of the gripping devices will be made purely and simply integral and the third gripping device or counter grip will be controlled by means of a right angled lever similar to that indicated by 68 on Figure 10.

The operation proper of the apparatus for taking views of Figure 12 does not call for any particular observation. As the three films are impressed simultaneously it is evident that the mean feed of these films is one-half the feed of the films necessary for the apparatus described in the first place, thus an important economy in film is obtained, and on the other hand the mechanical members have a longer life.

We claim:—

1. An apparatus for taking views for cinematography in three colors, comprising in combination a dark chamber, a single objective, a guide track for a negative film to receive impressions in one color positioned in alignment with the optical axis of said objective, an inclined glass positioned between the objective and said film track for reflecting rays from said objective, a second guide track for a second negative film adapted to receive impressions in two other colors and positioned to receive rays reflected from said glass, means for displacing said films, color selecting screens positioned between the inclined glass and the two films to be impressed, means for impressing the second negative film successively with rays corresponding to said two other colors, and means for impressing the first film by rays of said first color at the same time as the second film is impressed by one of the two other colors.

2. An apparatus for taking views for cinematography in three colors, comprising in combination a dark chamber, a single objective, a guide track for a negative film to receive impressions in one color positioned in alignment with the optical axis of said objective, an inclined glass positioned between the objective and said film track for reflecting rays from said objective, a second guide track for a second negative film adapted to receive impressions in two other colors and positioned to receive rays reflected from said glass, means for displacing said films, a shutter positioned between the objective and the inclined glass, a second shutter and a fixed screen for selecting the first color interposed between the inclined glass and the first film, two screens for selecting said two other colors positioned between said inclined glass and said second film, and means for moving said two screens to alternately position first one and then the other in the path of the rays reflected by said inclined glass.

AUGUSTE VALENTIN.
LAURENT BASSANI.